United States Patent
Ibrahim

(10) Patent No.: US 10,033,681 B2
(45) Date of Patent: Jul. 24, 2018

(54) SYSTEM AND METHOD FOR EMAIL NOTIFICATION

(71) Applicant: Excalibur IP, LLC, Sunnyvale, CA (US)

(72) Inventor: Ala' Ibrahim, San Jose, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 233 days.

(21) Appl. No.: 14/195,753

(22) Filed: Mar. 3, 2014

(65) Prior Publication Data
US 2015/0249633 A1    Sep. 3, 2015

(51) Int. Cl.
*G06F 3/048*    (2013.01)
*H04L 12/58*    (2006.01)
*G06Q 10/10*    (2012.01)

(52) U.S. Cl.
CPC .............. *H04L 51/24* (2013.01); *G06F 3/048* (2013.01); *G06Q 10/107* (2013.01)

(58) Field of Classification Search
CPC ....................................................... G06F 3/048
See application file for complete search history.

(56) References Cited

U.S. PATENT DOCUMENTS

| | | | | |
|---|---|---|---|---|
| 2007/0244782 A1* | 10/2007 | Chimento | .............. | G06Q 20/00 705/35 |
| 2008/0005247 A9* | 1/2008 | Khoo | .................... | G06F 3/0482 709/206 |
| 2009/0177747 A1* | 7/2009 | Agrawal | ................. | H04L 51/28 709/206 |
| 2010/0037050 A1* | 2/2010 | Karul | .................. | H04L 63/0428 713/167 |
| 2010/0198927 A1* | 8/2010 | Tonnison | .............. | G06Q 10/107 709/206 |
| 2013/0218986 A1* | 8/2013 | Sobhani | .................. | H04L 51/22 709/206 |
| 2013/0326331 A1* | 12/2013 | DeLuca | ............... | G06Q 10/107 715/234 |
| 2014/0337071 A1* | 11/2014 | Stiffler | ............. | G06Q 10/06311 705/7.13 |

OTHER PUBLICATIONS

Network Working Group, "Internet Message Format," Apr. 2011.

* cited by examiner

*Primary Examiner* — Xuyang Xia
(74) *Attorney, Agent, or Firm* — Cooper Legal Group, LLC

(57) ABSTRACT

A system and method for generating a notification email within the framework of standard email messaging protocols employs custom headers providing a short, informative notification of the subject of the email.

20 Claims, 11 Drawing Sheets

300

```
From: Me <me@example.com>
To: Team <myteam@example.com>
Message-ID: <5232ba10a2908_95c43ff665433be0159a80example.com>
Subject: I'm coming late today
Mime-Version: 1.0
Content-Type: text/plain;
  charset=UTF-8                  322
Content-Transfer-Encoding: 7bit
X-Notification: 1.0
X-Notification-Expires: Thu, 12 Sep 2013 12:30:00 -0700

I'm coming late today      324
```

320 { (braces around the two X-Notification lines)

FIG. 3

```
From: Some Company <somecompany@example.com>
To: You <you@example.com>
Message-ID: <5232ba10d9e5b_35c53ff665433be0155140example.com>
Subject: Someone spoke about you
Mime-Version: 1.0
Content-Type: multipart/alternative;
  boundary="--==_mimepart_5232ccf4b3814_39d83fd740433bd4433b7";
  charset=UTF-8
Content-Transfer-Encoding: 7bit
X-Notification: 1.0
X-Notification-Action-Text: See his note
X-Notification-Action-URL: http://example.com ----==_mimepart_5232ccf4b3814_39d83fd740433bd4433b7
Content-Type: text/plain;
  charset=UTF-8
Content-Transfer-Encoding: 7bit Someone Spoke about you
See Someones note in http://example.com/
----==_mimepart_5232ccf4b3814_39d83fd740433bd4433b7
Content-Type: text/html;
  charset=UTF-8
Content-Transfer-Encoding: quoted-printable <html><body><p>Someone spoke about you</p><p>See <a href=3D"http://exampl=
e.com/">Someones note</a><p>Some Company Info</p></body></html>=

----==_mimepart_5232ccf4b3814_39d83fd740433bd4433b7--
```

325 — X-Notification: 1.0
326 — X-Notification-Action-Text / X-Notification-Action-URL

*FIG. 4*

```
From: Me <me@example.com>
To: You <you@example.com>
Message-ID: <5232bai0a6ddb_36c53ff665433be0161ai@example.com>
Subject: My Birthday
Mime-Version: 1.0
Content-Type: multipart/alternative;
  boundary="----=_mimepart_5232ccf4b7599_39d83fd740433bd443685";
  charset=UTF-8
Content-Transfer-Encoding: 7bit
X-Notification: 1.0
X-Notification-Subject: My Birthday is next week, are you coming?
X-Notification-Action-Text1: Yes
X-Notification-Action-URL1: mailto:me@example.com?subject=Birthday%20coming
X-Notification-Action-Text2: No
X-Notification-Action-URL2: mailto:me@example.com?subject=Birthday%20not%20
    coming ------=_mimepart_5232ccf4b7599_39d83fd740433bd443685
Content-Type: text/plain;
  charset=UTF-8
Content-Transfer-Encoding: 7bit My Birthday is next week, are you coming?
Please reply
------=_mimepart_5232ccf4b7599_39d83fd740433bd443685
Content-Type: text/html;
  charset=UTF-8
Content-Transfer-Encoding: quoted-printable <html><body><h1>My Birthday is next week</h1><p>are you coming?</body></h=
tml>=

--=_mimepart_5232ccf4b7599_39d83fd740433bd443685
```

700                                     X-Headers Removed

```
From: Me <me@example.com>
To: You <you@example.com>
Message-ID: <5232ba10e6ddb_35c53ff665433b@0161a1@example.com>
Subject: My Birthday
Mime-Version: 1.0
Content-Type: multipart/alternative;
  boundary="----==_mimepart_5232ccf4b7599_39d83fd740433bd44358$";
  charset=UTF-8
Content-Transfer-Encoding: 7bit ----==_mimepart_5232ccf4b7599_39d83fd740433bd44358$
Content-Type: text/plain;
  charset=UTF-8
Content-Transfer-Encoding: 7bit My Birthday is next week, are you coming?
Please reply
----==_mimepart_5232ccf4b7599_39d83fd740433bd44358$
Content-Type: text/html;
  charset=UTF-8
Content-Transfer-Encoding: quoted-printable <html><body><h1>My Birthday is next week</h1><p>are you coming?</body></h=
tml>=

----==_mimepart_5232ccf4b7599_39d83fd740433bd44358$--
```

SYSTEM AND METHOD FOR EMAIL NOTIFICATION

CROSS-REFERENCE TO RELATED APPLICATIONS

None.

FIELD OF THE INVENTION

The invention disclosed broadly relates to the field of messaging, and more particularly relates to the field of e-mail messaging.

BACKGROUND OF THE INVENTION

Email messaging accounts are reported to number nearly 3.9 billion in 2013, and are expected to grow another billion by the end of 2017. (from April 2013 The Radicati Group, Inc. "Email Statistics Report, 2013-2017"). Not only are the number of email accounts growing, but the number of email messages that are sent is also growing, as more and more personal users and businesses rely on email for notifications.

Notifications announcing upcoming events, sales, offers, news items, and the like are being sent through email with greater frequency. Usually these emails provide a sender name and a subject line. People do not always follow the most efficient manner for communicating in an email message. Although proper email etiquette has been a concern among email users, efficient use of email seems to have been largely ignored. The subject line is where we see the most egregious examples of inefficiency. Very often the sender types in an overly broad or often misleading word or phrase as the subject.

Referring now to the drawings and to FIG. 1 in particular, there is shown an exemplary email inbox 100, according to the known art. Only two emails are shown here for simplicity. You will note that the inbox 100 displays the email senders 110 and the subject 120 of the emails. Taking note of the first email from "Lillian M." we see that the subject line 120 states "A Question." The recipient must open this email to see that the "question" was "can you let our manager know I'll be in late today?"

As another example of email inefficiency, a social networking site will send an email titled "Someone tagged you in a photo," and the recipient must open the email to retrieve the link to see the actual photo. These emails ends up filling up inboxes, making it hard for the user to focus more on other, perhaps more important emails.

There is a need for a system and method to overcome the above-stated shortcomings of the known art.

SUMMARY OF THE INVENTION

Briefly, according to an embodiment of the present disclosure, a method for generating a notification email within the framework of standard email messaging protocols employs custom headers providing a short, informative notification of the subject of the email. The method includes steps or acts of: in an email application, providing an option to compose a notification email; receiving a selection of the option; providing a notification header screen in response to selecting the option; receiving the completed notification header screen; and receiving a command to send the notification email with headers.

According to another embodiment of the present disclosure, an information processing system for generating a notification email includes at least a processor device and a memory operably coupled with the processor device. The memory contains computer-executable instructions such as: providing an option to compose a notification email; receiving a selection of the option to compose the notification email; providing a notification header screen; receiving a completed notification header screen; and receiving a command to send the notification email.

According to another embodiment of the present disclosure, a computer program product includes a non-transitory computer-readable storage medium with computer-executable instructions stored thereon. The computer-executable instructions, when executed by a computer, enable the computer to generate a notification email by: providing an option to compose the notification email; receiving a selection of the option; providing a notification header screen soliciting input in determining notification headers to be included with the notification email; receiving a completed notification header screen; and receiving a command to send the notification email with the notification headers.

BRIEF DESCRIPTION OF THE SEVERAL VIEWS OF THE DRAWINGS

To describe the foregoing and other exemplary purposes, aspects, and advantages of the present disclosure, we use the following detailed description of exemplary embodiments of the disclosure with reference to the drawings, in which:

FIG. 3 shows an exemplary notification email with an X-Notification-Expires Header, according to an embodiment of the present disclosure;

FIG. 4 shows an exemplary notification email with X-Notification-Action Headers, according to another embodiment of the present disclosure;

FIG. 5 shows an exemplary notification email with multiple X-Notification-Action Headers, according to another embodiment of the present disclosure;

FIG. 7 shows an exemplary notification email with X-Headers removed, according to an embodiment of the present disclosure;

Figure 1:
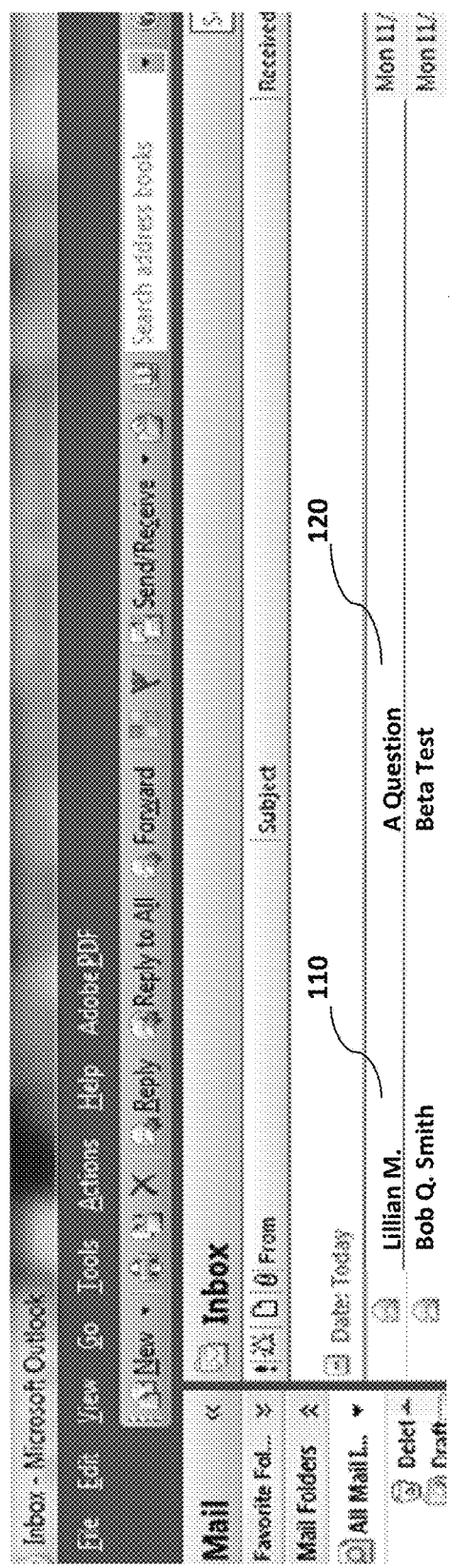
FIG. 1 shows an email message with subject line, according to the known art.

While the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this disclosure we describe a novel system and method of sending email notifications (X-Notifications) to recipients, while supporting current email messaging protocols. The X-Notification email method, according to an embodiment of the present disclosure, employs custom headers that provide a short, informative notification of the subject of the email such that the email recipient does not need to open and read the email to know what it contains. Further, the recipient is able to acknowledge and appropriately respond to the sender, again without having to open the email read the email body.

We provide a format that can be added to these X-Notification emails such that the recipient can organize his/her mailbox to distinguish the notification emails from standard emails, and can act directly without the need for opening the email, and without the need to keep the X-Notification emails in his/her Inbox. The X-Notifications are customized so that recipients who subscribe to the X-Notification email system will recognize the headers. On the other hand, if the email recipient does not subscribe to the X-Notification system and thus does not recognize these emails as X-Notifications, then the recipient simply opens the X-Notification as any other email. This is possible because the X-Notification emails work with the standard email protocols.

The X-Notification emails can be easily distinguishable from regular emails, even though they can be sent through regular email channels and can appear in the same inbox as the regular emails. In this manner the email client can see the emails he/she needs to read, and also get the gist of what that the X-Notification provides. As more and more of the X-Notification emails are sent, email clients will be able to focus more on the emails that need to be read, and can act directly on these emails, without the need to open the email, and look for a link in order to perform a required action. We identify the X-Notification emails in a distinctive manner and provide the notification as the subject of the email, with the link provided in the email.

The present disclosure will now be described with respect to FIGS. 2-11 which are block diagrams and flowchart illustrations of embodiments of the present disclosure. It will be understood that each block of the flowchart illustrations and/or block diagrams, and combinations of blocks in the flowchart illustrations and/or block diagrams, can be implemented by computer program instructions.

Figure 6:
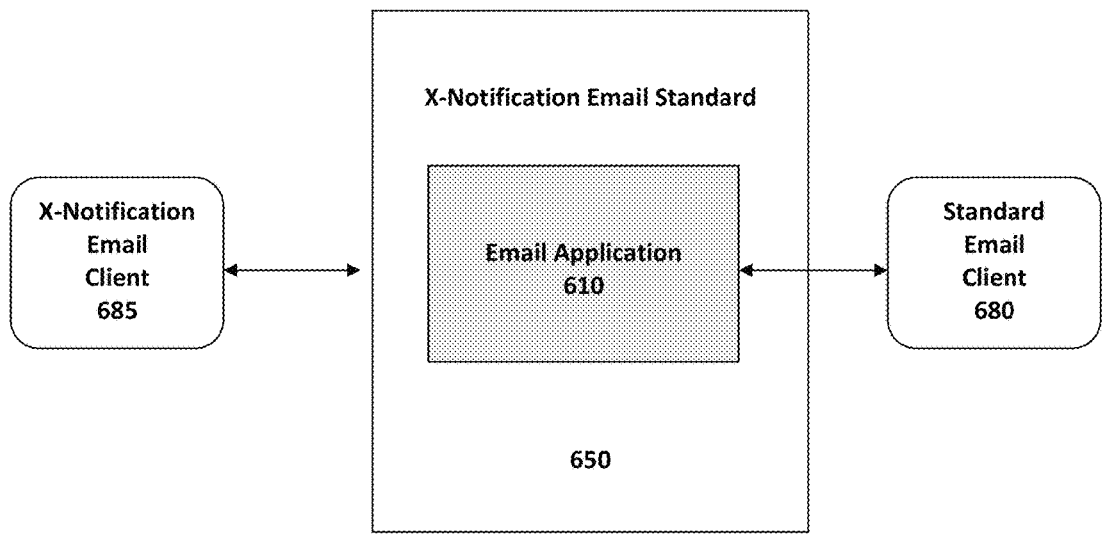
FIG. 6 is a simplified block diagram of an X-Notification email system, according to an embodiment of the present disclosure.

Referring now to the drawings and to FIG. 6 in particular, we show a basic illustration of an X-Notification Email system 600 in which the present disclosure is implemented. We show that the X-Notification Email 650 can be implemented as a wrapper around a standard Email Application 610. An X-Notification Email Client 685 (a client with X-Notification enabled on the messaging utility) interacts with the X-Notification Email Standard 650 through the Email Application 610. We will describe this interaction in the description of the X-Notification UI in FIGS. 8 and 9.

Because the X-Notification Email Standard 650 is compatible with standard email protocols, Standard-only Email Clients 680 (clients who do not have X-Notification enabled) are not barred from receiving emails that originate as X-Notification Emails. In the case of Standard Email Clients 680 who receive X-Notification Emails, they will receive the X-Notification Emails as regular emails, with no X-Headers visible. An example of this is shown in FIG. 7.

Figure 2:
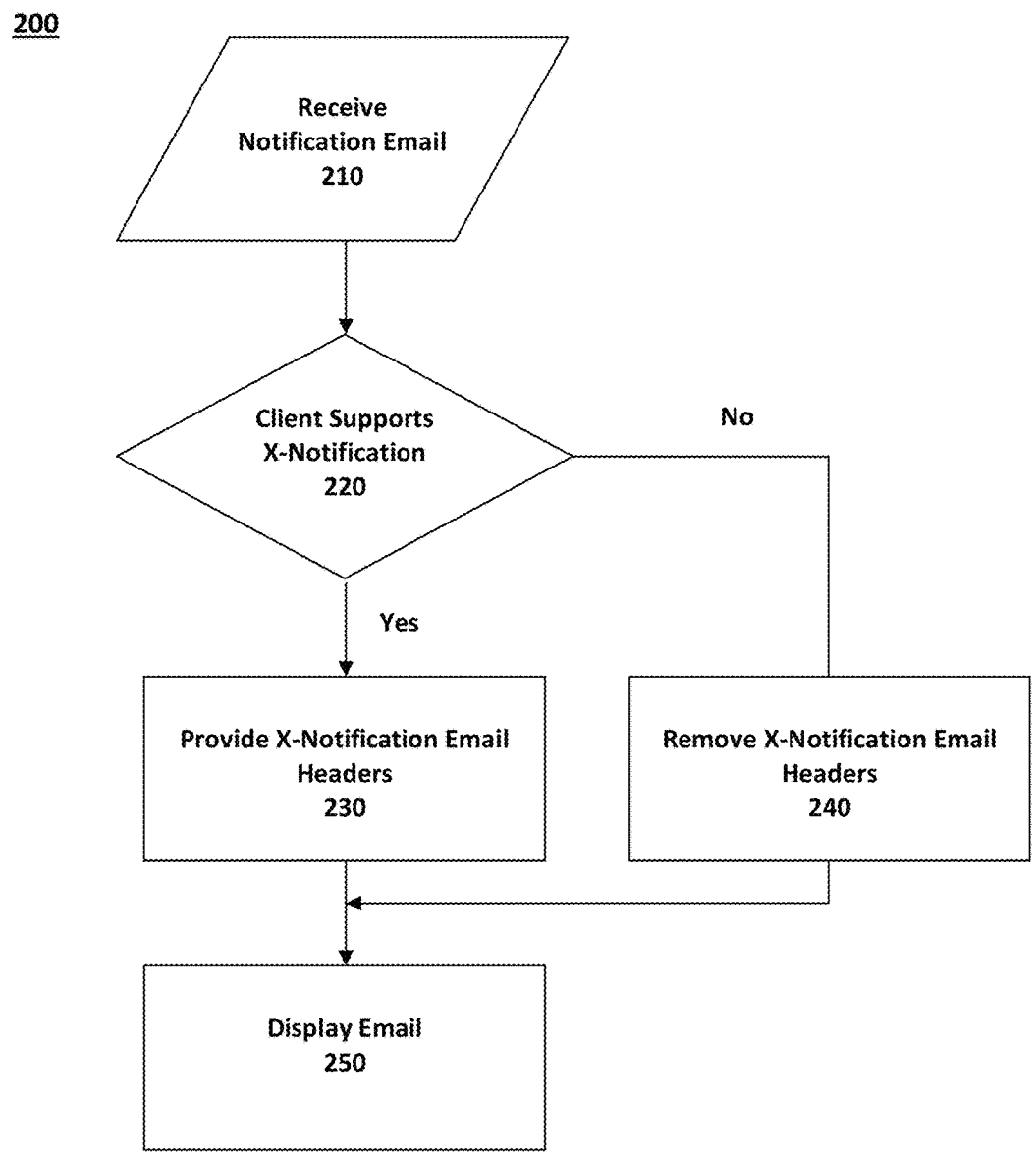
FIG. 2 shows a high-level flowchart of a method according to an embodiment of the present disclosure.

Referring now to FIG. 2, we show a high-level flowchart 200 of a method for X-Notification emails, implemented according to an embodiment of the present disclosure. First in step 210, an email system 600 receives an X-Notification email addressed to an email client. In step 220 the system 600 determines if the email client supports X-Notification. If the client supports X-Notification, then in step 230 the X-Notification email headers remain in the email message. Then, in step 250 the email is displayed to the email client as an X-Notification email.

If, however the email client does not support X-Notification, then in step 240 the X-Notification headers are removed and the email, without the headers, is displayed to the client in step 250. As will be noted, the X-Notification email method acts as a wrapper around standard email applications.

An X-Notification email can be sent in multiple ways, for example a social networking site, or a bank, could apply X-Notification Headers using the script that sends emails usually, or a user could append X-Notification Headers for specific emails using a filter. The X-Notification headers are not restricted to email messages only. In the case of other services or utilities that wish to provide the functionality of X-Notification Headers, we add documentation about using specific Headers (e.g. X-Notification-Subject, X-Notification-Expires), or a specific body type (e.g. text/notification).

Referring to FIGS. 3-5, we show simplified depictions of X-Notification Emails 300, according to embodiments of the present disclosure. The X-Notification Emails 300 are distinguished from regular emails by their headers, which are:

X-Notification Headers 320.

X-Notification 322. This header contains a version number, and is used to identify an email as an X-Notification email 300. A proposed value can start at 1.0. This header is required for all X-Notification emails 300.

X-Notification-Subject 328. This header contains the subject (title) of the notification. If this header is not present, the title of the notification defaults to the subject of the email.

X-Notification-Action-Text 325. This header contains the text for the action that a client can take based on this notification. If this header is not provided, this means that no action is required. If more than one action can be taken, the header name is followed by a number, as in X-Notification-Action-Text1, X-Notification-Action-Text2, and the like. For each X-Notification-Action-Text header, an X-Notification-Action-URL should be provided.

X-Notification-Action-URL 326. This header provides a URL to perform the action specified in X-Notification-Action-Text. Just as in X-Notification-Action-Text, multiple entries can be sent as X-Notification-Action-URL1, X-Notification-Action-URL2, and so on.

X-Notification-Expires 324. This header provides an expiry date/time for the notification; which means that the notification is not useful after the provided time. For example, the X-Notification-Expires header 324 would be useful for a meeting or birthday party notification. The expiration should be in the email messaging format as prescribed by the Internet Engineering Task Force (IETF) in their RFC (Request for Comments) Internet Message Format 2822. RFC 2822 specifies a syntax for text messages that are sent between computer users, within the framework of "electronic mail" messages.

Referring now to the example email 300 shown in FIG. 3, the email client is receiving an X-Notification email 300, titled "I'm coming in late today," and an expiration date listed as Sep. 12, 2013 12:30 PM PST. After this date and time, the notification is not relevant so the email client is free to disregard. This example email 300 contains only two X-Notification Headers 320. The first one is the required Header 322 that identifies this email 300 as an X-Notification email. This header provides the version number, which in this case is 1.0. Also shown is the X-Notification-Expires Header 324.

In FIG. 4, we show an exemplary X-Notification email where the sender has sent a notification titled "Someone spoke about you," and provides an action (X-Notification-Action-Text 325) to see the note at the provided URL (X-Notification-Action-URL 326).

In FIG. 5, we show an X-Notification Email entitled "My Birthday." The subject of the email as provided in the X-Notification-Subject header 328 is "My Birthday is next week, are you coming?" and two possible responses/actions are provided as replies to this email. The email recipient knows what the email is about (a Birthday party invitation) and can appropriately respond without ever having to open the mail. To provide a "Yes" response to the Birthday party invitation, the email recipient follows the link to URL1 (mailto:me@example.com?subject=Birthday %20coming). In the alternative, to provide a "No" response to the invitation, the email recipient follows the link to URL2 (mailto:me@example.com?subject=Birthday%20not%20coming). This example provides just one of the many uses for the Action and URL headers.

Figure 8:
FIG. 8 shows an exemplary email inbox where both X-Notifications and standard email messages are received, according to an embodiment of the present disclosure.

Referring now to FIG. 8, we show an exemplary illustration of an email Inbox 800 of an email client with X-Notification enabled. Here the email client is easily able to distinguish between X-Notification emails 300 and regular emails. The X-Notification emails 300 are easily distinguishable by a distinct icon 810 (here it is shown as an "X") and the Subject line featuring an X-Notification-Subject 328.

Figure 9:
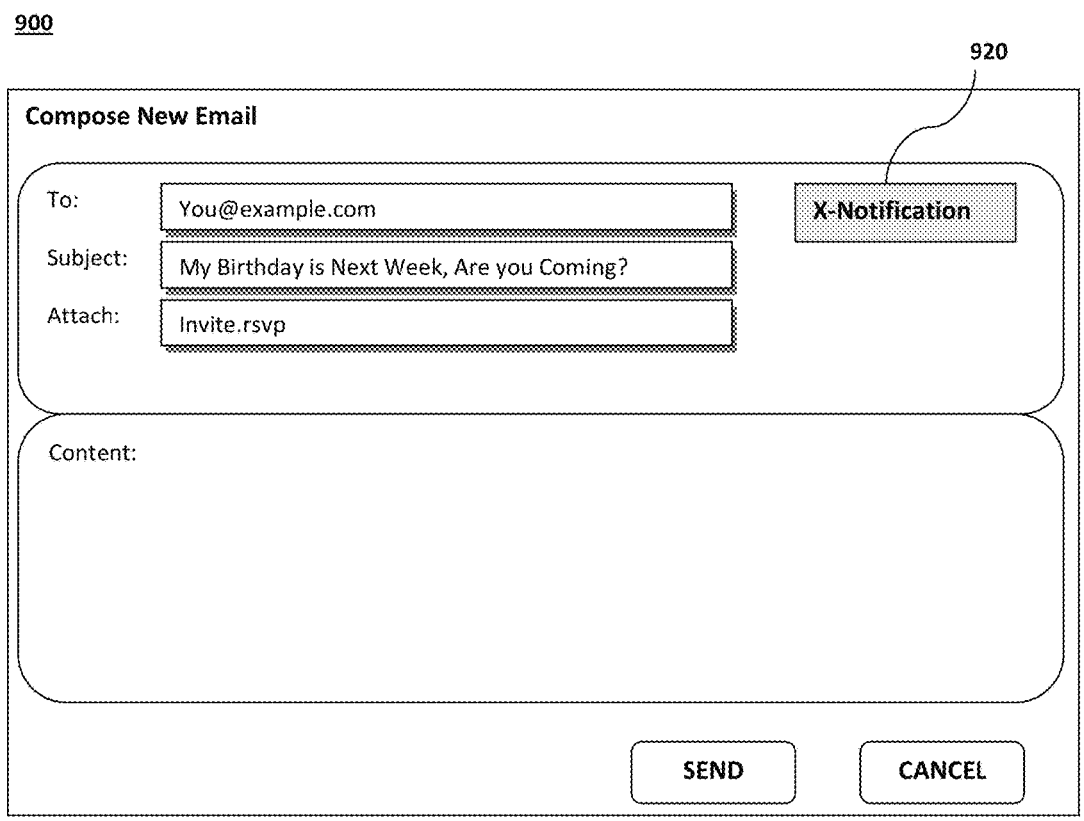
FIG. 9 shows an exemplary user interface for the X-Notification email system, according to an embodiment of the present disclosure.
Figure 10:
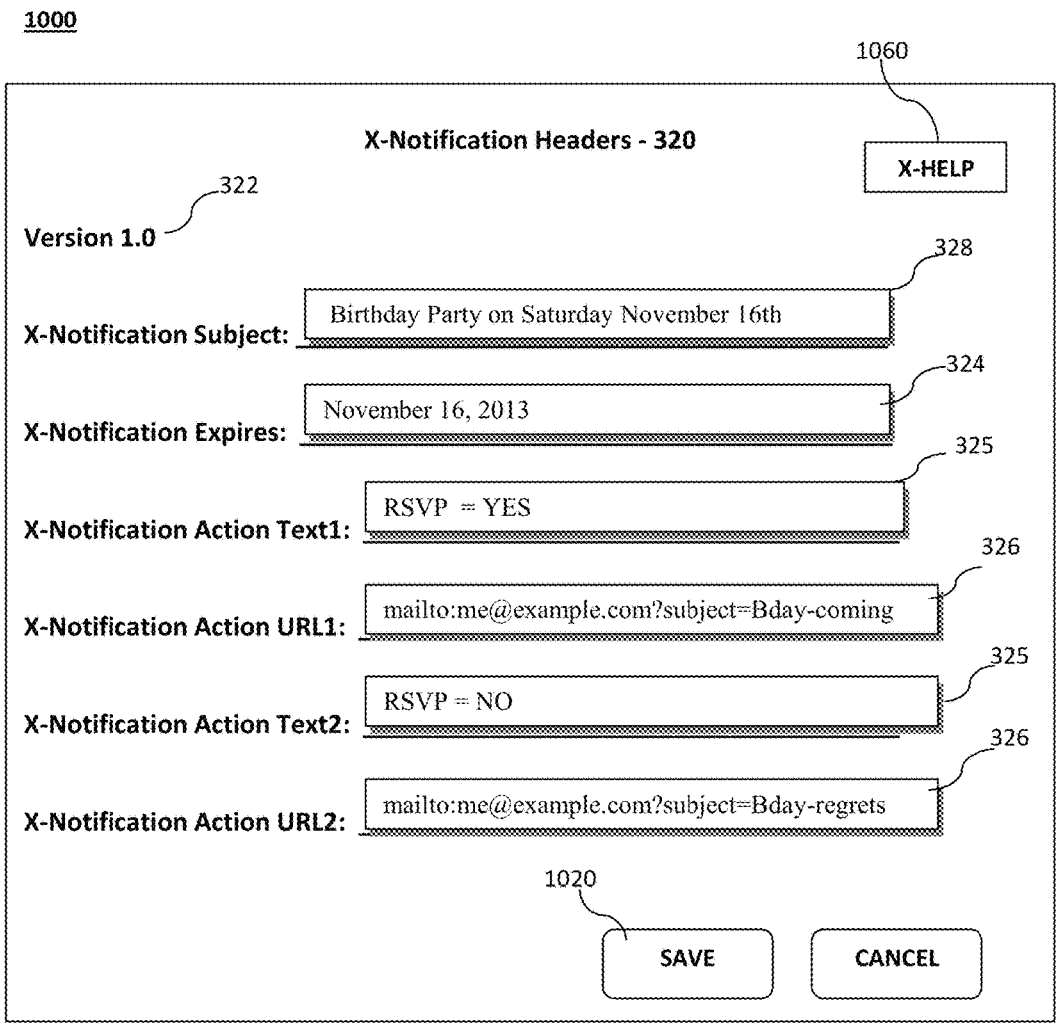
FIG. 10 shows a pop-up box used with the X-Notification email system, according to an embodiment of the present disclosure.

In FIG. 9 we show a simplified illustration of one embodiment of a user interface (UI) 920 for X-Notifications. As part of a regular email compose screen 900, we can provide an icon or button 920 for generating an email as an X-Notification email 300. Here we see that the email client has filled in the basic information for sending an email (the recipient and the subject). This is standard procedure for most, if not all, email messaging systems. For X-Notification emails 300, the content can be left blank or filled in as the user desires. In this example, the client has elected to send this email as an X-Notification email 300 by selecting the X-Notification UI button 920. The button 920 can be selected by a mouse click, a tap, or any other method of selection known or contemplated, within the spirit and scope of the disclosure.

When the UI button 920 is selected, a pop-up window or screen 1000 appears where the client can provide the X-Notification Headers 320 as free-form text. Note that the X-Notification Version Number Header 322 is automatically filled in by the system 600. In this screen 1000, the user does not have to fill in any of the headers 320. In order to enable X-Notification, all the client has to do is select the "SAVE" button 1020 and the information entered by the client in the Compose screen 900 will be sent as an X-Notification email, with the X-Notification-Subject 328 defaulting to the Subject line of the compose screen 900.

If, however, the client wishes to elaborate, then the client can fill in any of the header input boxes. For example, in FIG. 10 we show that the client has selected the X-Notification-Subject Header 328 of "Birthday Party on Saturday November 16th." The client has also filled in the X-Notification-Expires Header 324 and the X-Notification-Action-Text 325 and X-Notification-URL 326 Headers. A Help button 1060 is available to guide the clients in filling in the fields. Those with knowledge in the art will appreciate that this is but one example of an interface 1000 that can be used with the X-Notification-Email System 600.

Processing can be performed using Java-based or JavaScript technologies, although other similar technologies now known or subsequently developed may be used for the processing.

Figure 11:
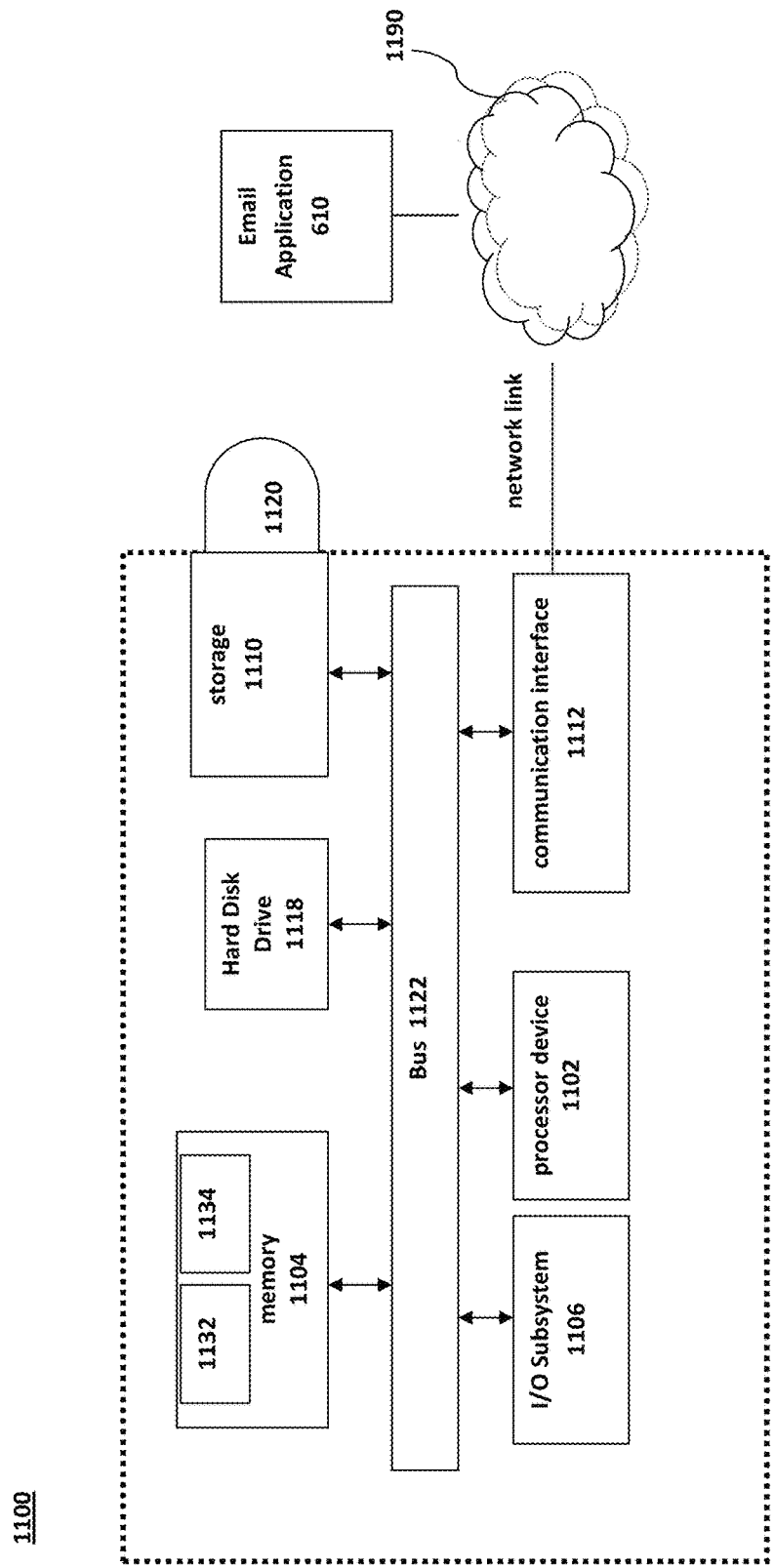
FIG. 11 shows a simplified block diagram of the hardware components required to implement the X-Notification method, according to an embodiment of the present disclosure.

FIG. 11 Hardware Embodiment.

Referring now in specific detail to the drawings, and particularly FIG. 11, there is provided a simplified pictorial illustration of an information processing system configured for generating and processing X-Notifications, in which the present disclosure may be implemented. For purposes of this invention, computer system 1100 may represent any type of computer, information processing system or other programmable electronic device, including a client computer, a server computer, a portable computer, an embedded controller, a personal digital assistant, a Cloud computing device, TV Internet, and so on.

The computer system 1100 may be a stand-alone device or networked into a larger system. Computer system 1100, illustrated for exemplary purposes as a networked computing device, is in communication with other networked computing devices (not shown) via network 1110. As will be appreciated by those of ordinary skill in the art, network 1110 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 1100. As will be appreciated by those of ordinary skill in the art, aspects of the invention may be distributed amongst one or more networked computing devices which interact with computer system 1100 via one or more data networks such as, for example, network 1110. However, for ease of understanding, aspects of the invention have been embodied in a single computing device—computer system 1100.

Computer system 1100 includes processing device 1102 which communicates with an input/output subsystem 1106, memory 1104, storage 1110 and network 1110. The processor device 1102 is operably coupled with a communication infrastructure 1122 (e.g., a communications bus, cross-over bar, or network). The processor device 1102 may be a general or special purpose microprocessor operating under control of computer program instructions 1132 executed from memory 1104 on program data 1134. The processor 1102 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 1104 may be partitioned or otherwise mapped to reflect the boundaries of the various memory subcomponents. Memory 1104 may include both volatile and persistent memory for the storage of: operational instructions 1132 for execution by CPU 1102, data registers, application storage and the like. Memory 1104 preferably includes a combination of random access memory (RAM), read only memory (ROM) and persistent memory such as that provided by a hard disk drive 1118. The computer instructions/applications that are stored in memory 1104 are executed by processor 1102. The computer instructions/applications 1132 and program data 1134 can also be stored in hard disk drive 1118 for execution by processor device 1102.

The I/O subsystem 1106 may comprise various end user interfaces such as a display, a keyboards, and a mouse. The I/O subsystem 1106 may further comprise a connection to a network 1190 such as a local-area network (LAN) or wide-area network (WAN) such as the Internet 1190. Computer system 1100 can access the Email Application 610 through the Internet 1190.

The computer system 1100 may also include a removable storage drive 1110, representing a floppy disk drive, a magnetic tape drive, an optical disk drive, etc. The removable storage drive 1110 reads from and/or writes to a removable storage unit 1120 in a manner well known to those having ordinary skill in the art. Removable storage unit 1120, represents a floppy disk, a compact disc, magnetic tape, optical disk, CD-ROM, DVD-ROM, etc. which is read by and written to by removable storage drive 1110. As will be appreciated, the removable storage unit 1120 includes a non-transitory computer readable medium having stored therein computer software and/or data.

The computer system 1100 may also include a communications interface 112. Communications interface 1112 allows software and data to be transferred between the computer system and external devices. Examples of communications interface 1112 may include a modem, a network interface (such as an Ethernet card), a communications port, a PCMCIA slot and card, etc. Software and data transferred via communications interface 1112 are in the form of signals which may be, for example, electronic, electromagnetic, optical, or other signals capable of being received by communications interface 1112.

In this document, the terms "computer program medium," "computer usable medium," and "computer readable medium" are used to generally refer to both transitory and non-transitory media such as main memory 1104, removable storage drive 1120, a hard disk installed in hard disk drive 1118. These computer program products are means for providing software to the computer system 1100. The computer readable medium 1120 allows the computer system 1100 to read data, instructions, messages or message packets, and other computer readable information from the computer readable medium 1120.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

I claim:

1. A method, comprising:
    in an email compose screen of an email application, providing an option to compose a notification email;
    receiving a selection, by a user, of the option to compose the notification email;
    providing a notification header screen in response to receiving the option, the notification header screen soliciting user input in determining notification headers, different than a subject header, a from header and a to header of the notification email, to be included with the notification email;
    receiving a completed notification header screen comprising user input used to determine:
        a notification expiry date header indicative of a date and time after which at least one of the notification headers is no longer relevant and is to be disregarded; and
        a notification response header corresponding to a mechanism for a recipient of the notification email to respond to the notification email without opening the notification email by selecting a link from amongst:
            a first link corresponding to a first email response, to the notification email, communicable via email; and
            a second link corresponding to a second email response, to the notification email, communicable via email,
            the first email response different than the second email response, information corresponding to the first email response and the second email response included in the notification response header; and
    receiving a command, by the user, to send the notification email with the notification expiry date header and the notification response header.

2. The method of claim 1, wherein providing the option comprises providing a graphical user interface in the email application.

3. The method of claim 1, wherein receiving the completed notification header screen comprises:
    providing a default subject to be used as a first header for the notification email.

4. The method of claim 1, wherein receiving the completed notification header screen comprises receiving user input used to determine a notification subject header, different than the subject header, to be used in the notification email.

5. The method of claim 1, wherein receiving the completed notification header screen comprises receiving user input used to determine the notification expiry date header.

6. The method of claim 1, wherein receiving the completed notification header screen comprises:
receiving user input used to determine the notification response header.

7. The method of claim 6, wherein receiving the completed notification header screen comprises:
receiving user input used to determine a notification location header specifying an internet address to access as part of the mechanism to respond to the notification email without opening the notification email.

8. The method of claim 7, wherein receiving the completed notification header screen comprises:
receiving user input used to determine a plurality of numbered notification response headers in the notification email; and
receiving user input used to determine a plurality of numbered notification location headers, each numbered notification location header corresponding to a like-numbered notification response header.

9. An information processing system, comprising:
a processor device; and
a memory operably coupled with the processor device, the memory having stored thereon computer-executable instructions comprising instructions for:
in an email compose screen of an email application, providing an option to compose a notification email;
receiving a selection, by a user, of the option to compose the notification email;
providing a notification header screen in response to receiving the option, the notification header screen soliciting user input in determining notification headers, different than a subject header, a from header and a to header of the notification email being composed, to be included with the notification email;
receiving a completed notification header screen comprising user input used to determine:
a notification expiry date header indicative of a date and time after which at least one of the notification headers is no longer relevant and is to be disregarded; and
a notification response header corresponding to a mechanism for a recipient of the notification email to respond to the notification email without opening the notification email by selecting a link from amongst:
a first link corresponding to a first email response, to the notification email, communicable via email; and
a second link corresponding to a second email response, to the notification email, communicable via email,
the first email response different than the second email response,
information corresponding to the first email response and the second email response included in the notification response header; and
receiving a command, by the user, to send the notification email with at least one of the notification expiry date header and the notification response header.

10. The information processing system of claim 9, wherein providing the option comprises providing a graphical user interface in the email application.

11. The information processing system of claim 9, wherein receiving the completed notification header screen comprises receiving user input used to determine a notification subject header, different than the subject header, to be used in the notification email.

12. The information processing system of claim 9, wherein receiving the completed notification header screen comprises receiving user input used to determine the notification expiry date header.

13. The information processing system of claim 9, wherein receiving the completed notification header screen comprises:
receiving user input used to determine the notification response header.

14. The information processing system of claim 13, wherein receiving the completed notification header screen comprises:
receiving user input used to determine a notification location header specifying an internet address to access as part of the mechanism to respond to the notification email without opening the notification email.

15. The information processing system of claim 14, wherein receiving the completed notification header screen comprises:
receiving user input used to determine a plurality of numbered notification response headers in the notification email; and
receiving user input used to determine a plurality of numbered notification location headers, each numbered notification location header corresponding to a like-numbered notification response header.

16. A computer program product comprising a non-transitory computer-readable storage medium with computer-executable instructions stored thereon, the computer-executable instructions comprising instructions for:
receiving an email;
responsive to determining that the email has one or more sender-defined notification headers different than a subject header, a from header and a to header of the email, determining that the email is a notification email rather than a regular email, the one or more sender-defined notification headers comprising:
a notification expiry date header indicative of a date and time after which at least one of the notification headers is no longer relevant and is to be disregarded; and
a notification response header corresponding to an inbox-based mechanism to respond to the email, from an inbox, without opening the email by selecting a link from amongst a plurality of links comprising:
a first link corresponding to a first email response, to the email, communicable via a second email from a recipient of the email to a sender of the email; and
a second link corresponding to a second email response, to the email, communicable via a third email from the recipient of the email to the sender of the email,
the first email response different than the second email response, information corresponding to the first email response and the second email response included in the email; and
providing, via an email application, an indication of the email in the inbox based upon the notification expiry date header and the notification response header, wherein the indication is associated with notification emails.

17. The computer program product of claim 16, wherein the computer-executable instructions comprise instructions for receiving a second email different than the email.

18. The computer program product of claim 17, wherein the computer-executable instructions comprise instructions for responsive to determining that the second email does not have one or more notification headers different than a from header and a to header of the second email, determining that the second email is a regular email rather than a notification email.

19. The computer program product of claim 16, wherein the first link comprises a first email address of the sender of the email and a first subject, and the second link comprises the first email address and a second subject different than the first subject.

20. The computer program product of claim 16, wherein the computer-executable instructions comprise instructions for providing, in the inbox, a second indication of the first link corresponding to the first email response to the email and providing, in the inbox, a third indication of the second link corresponding to the second email response to the email.

* * * * *